United States Patent Office
3,832,328
Patented Aug. 27, 1974

3,832,328
ORGANIC COMPOSITIONS STABILIZED WITH PHENOLIC THIOCARBOXYLIC ACID ESTERS
Heinz Eggensperger, Gadernheim over Bensheim, Volker Frenzen, Heidelberg, Horst Muller, Furth-Odenwald, and Hans Stephan, Bensheim, Germany, assignors to Ciba-Geigy AG, Basel, Switzerland
No Drawing. Continuation-in-part of abandoned application Ser. No. 883,314, Dec. 8, 1969, which is a division of application Ser. No. 661,213, Aug. 17, 1967, now Patent No. 3,637,802, dated Jan. 25, 1972. This application Aug. 9, 1971, Ser. No. 170,313
Claims priority, application Germany, Aug. 18, 1966, D 50,874
Int. Cl. C08c 27/66; C08f 45/58; C08g 51/58
U.S. Cl. 260—45.85 B                                    13 Claims

ABSTRACT OF THE DISCLOSURE

Compounds of the formulae

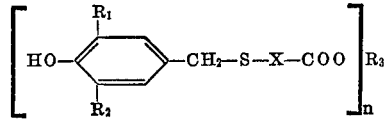

(Ia)

and

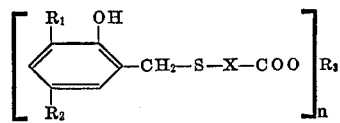

(Ib)

are used as stabilizers for organic compositions.
In the formulae
$n$ is an integer from 1 to 4
$R_1$ and $R_2$ are alkyl
$R_3$ for $n=1$, is a member of the group consisting of sulfur interrupted alkyl, oxygen interrupted alkyl, alkyl, phenyl, benzyl and phenyl having alkyl subsitutes; for $n=2$, alkylene; for $n=3$, alktriyl and for $n=4$, alktetrayl and
X is alkylene.

This invention relates to novel mercaptocarboxylic acid esters and to organic compounds stabilized therewith. This application is a continuation-in-part of our copending application Ser. No. 883,314 filed Dec. 8, 1969 now abandoned which is a division of application Ser. No. 661,213 filed Aug. 17, 1967 now U.S. Pat. No. 3,637,802, issued Jan. 25, 1972.

The new mercapto carboxylic acid esters are (hydroxy dialkyl-benzyl) mercapto alkane-carboxylic acid esters of the formulae

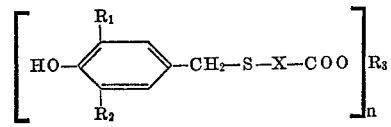

(Ia)

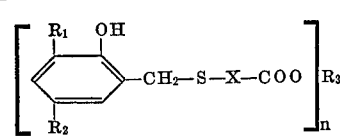

(Ib)

wherein $n$ is an integer from 1 to 4,
$R_1$ and $R_2$ are the same or different linear or branched alkyl groups having preferably 1 to 6 C atoms,
$R_3$ is a linear, branched or cyclic alkyl sulfur oxygen interrupted alkyl, phenyl, benzyl or phenyl having alkyls of 1 to 9 carbons (if $n=1$) or an alkylene group (if $n=2$), alktriyl (if $n=3$) and alktetrayl (if $n=4$), containing 1–20 C atoms, whereby said groups may be substituted for $n=1$, $-C_2H_4-$ for $n=2$,

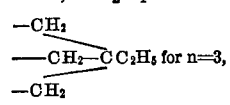

and

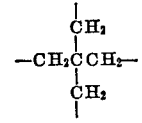

for $n=4$ and X is a linear or branched lower alkylene group.

The compounds of the invention are useful as stabilizers against photochemical, thermochemical, and oxidative degradation of polymeric resins such as polyolefins, such as polyethylene, polypropylene, isobutylene and mixtures thereof, polyamides, such as nylon, shock-resistant polystyrene such as butadiene-styrene polymers, polyacetals, polystyrene ABS polymers (copolymers of acrylonitrile, butadiene, and styrene) vinyl polymers such as polyvinyl chloride, polyvinylidene chloride and the like, vegetable and animal oils and fats, plasticizers such as phthalates, and mineral oils. Examples of vegetable oils and fats are almond oil, castor oil, coconut oil, corn oil, cotton seed oil, hemp seed oil, linseed oil, olive oil, palm oil, peanut oil, safflower oil, soybean oil, sunflower seed oil, tung oil and wheat germ oil; animal oils and fats are butter fat, tallow, lard, fish oil, train oil, whale oil, and sperm oil; and mineral oils are fuel oil, kerosine, tree-spray oil, lubricants and heavy oils. Examples of plasticizers are adipic acid esters, oleic acid esters, phthalic acid esters, sebacic acid esters, stearic acid esters, epoxidized esters, and phosphoric acid esters.

Generally, we prefer the esters of higher alcohols, particularly those which contain sulfur in form of a thioether group. Such esters are compatible with polymeric resins, fats and mineral oils and exert, a good stabilizing effect on these materials even after prolonged thermal stresses due to their low volatility.

Particularly good results are obtained with compounds of the formula

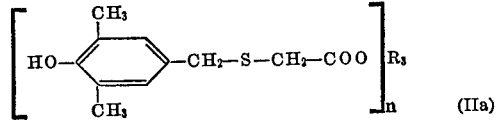

(IIa)

wherein $R_3$ for $n=1$ is a linear, branched, or cyclic alkyl of 8 to 20 carbons, sulfur interrupted alkyl, oxygen interrupted alkyl, phenyl, benzyl or alkyl substituted phenyl and which contains a total of 4 to 20 carbons; for $n=2$, $R_3$ is a linear, branched or cyclic alkylene; for $n=3$ a linear or branched alktriyl and for $n=4$, a linear or branched alktetrayl which may be substituted and which contains a total of 2–10 C-atoms.
Examples of suitable $R_3$ groups are:
For $n=1$,

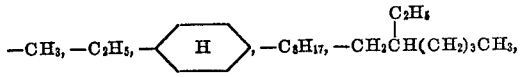

$-C_{10}H_{21}, -C_{12}H_{25},$

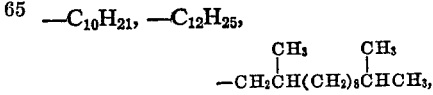

For $n=1$,

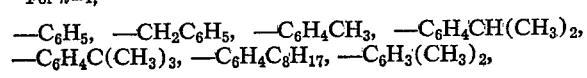
$-C_6H_4C(CH_3)_3, -C_6H_4C_8H_{17}, -C_6H_3(CH_3)_2,$

—C₆H₃[CH(CH₃)₂]₂,
—C₆H₃(C₈H₁₇)₂, —C₆H₃(C₉H₁₉)₂, —CH₂CH₂SCH₂CH₃,
—CH₂CH₂SC₄H₉, —C₃H₆SC₃H₇, —C₄H₈SC₄H₉,

—C₂H₄SC₂H₄SC₂H₅,

—C₂H₄OC₂H₅, C₂H₅OC₄H₉, —C₃H₆OC₃H₇,

—C₄H₈OC₄H₉ and —C₂H₄OC₂H₄OC₂H₅;

For n=2, —CH₂—, —(CH₂)₄—, —(CH₂)₅—,

—(CH₂)₁₀—,

—(CH₂)₁₅—,

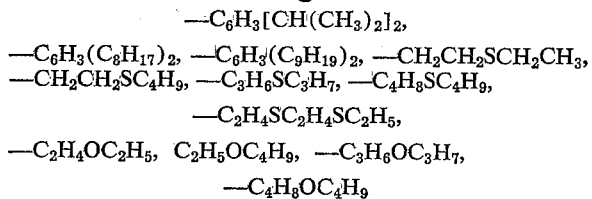

—C₆H₄—, —CH₂C₆H₄—, —C₂H₄SC₂H₄—,

—C₂H₄SC₄H₈—,

—C₃H₆SC₃H₆—, —C₄H₈SC₄H₈—, —C₂H₄SC₂H₄SC₂H₄—,
—C₂H₄OC₂H₄—, —C₂H₄OC₄H₈—, —C₃H₆OC₃H₆—,
—C₄H₈OC₄H₈— and —C₂H₄OC₂H₄OC₂H₄—;

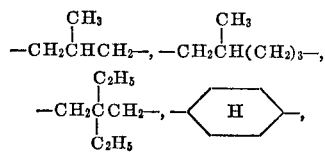

and

For n=4,

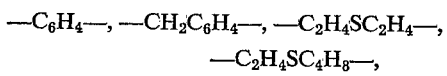

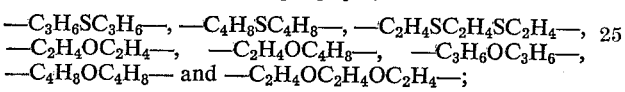

and

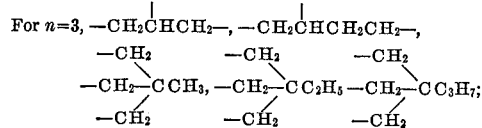

The preferred stabilizers of the above formula for rubber, (natural and synthetic) oils and vinyl polymers have n=1, X=—CH₂— and as R₃ an alkyl of 10 to 14 carbons or sulfur interrupted alkyl of 4 to 8 carbons containing one or two sulfur atoms.

The preferred stabilizers of the above formula for polyolefins have as R₃ an alkyl of 16 to 18 carbons, oxygen interrupted alkyl of 4 to 8 carbons, phenyl or phenyl with one or two alkyl substitutions of 1 to 9 carbons when n=1. The value of n(1, 2, 3 or 4) is not critical and X may be —CH₂—, —(CH₂)₂—, —(CH₂)₄— or —(CH₂)₅.

It is preferred to use a sulfur interrupted alkyl for the stabilization of polyacetals.

Those compounds in which n=1 and R₃ contains 12 or more carbon atoms, are physiologically harmless and therefore suitable for the stabilization of edible fats or oils and for wrappings. (4-hydroxy-2,6-dimethyl-benzyl) thioglycolic acid stearyl ester (R=C₁₈H₃₇), e.g. has shown to be completely untoxic in rat feeding tests.

Generally, the stabilizers of the invention are used in amounts of 0.001 to 10 percent, usually 0.01 to 10% and preferably 0.05 to 5% calculated on the total weight of the material to be stabilized.

The new compounds of the invention can be prepared by various methods. We prefer the following procedures:

1) The reaction of Mannich bases of the general formula

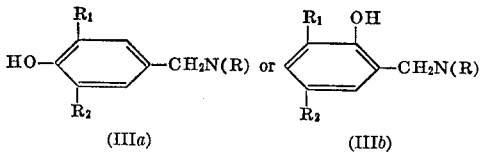

(IIIa)        (IIIb)

wherein R₁ and R₂ have the significance given above, and R is a preferably lower alkyl group, with mercaptoacid esters in a dry inert organic solvent such as toluene, or with an alcohol corresponding to the R₃ residue, in the presence of a catalytic amount of a base, preferably an alkali metal or alkaline earth metal alcoholate, or (2) the reaction of the respective dialkyl phenols with mercaptoacids and formaldehyde, or formaldehyde developing substances, in an inert solvent or lower alcohol in the presence of a base, preferably an alkali metal or alkaline earth metal alcoholate, and esterification of the thus obtained acids.

Said preparation methods furnish the new compounds in yields of 70 to 95 percent.

Some examples of compounds corresponding to formula Ia are given in Table I, and examples of compounds corresponding to formula Ib are given in Table II.

TABLE I

| R₁ | R₂ | X | n | R₃ | Melting point | Stabilizer No. |
|---|---|---|---|---|---|---|
| CH₃ | CH₃ | —CH₂— | 1 | —C₂₀H₄₁ | 54–56° C | |
| CH₃ | CH₃ | —CH₂— | 1 | —C₁₈H₃₇ | 52–53° C | I |
| CH₃ | CH₃ | —CH₂— | 1 | —CH₂CHC₄H₉<br>\|<br>C₂H₅ | Liquid | |
| CH₃ | CH₃ | —CH₂— | 1 | —C₁₀H₂₁ | do | II |
| CH₃ | CH₃ | —CH₂— | 1 | —CH₂CH₂OC₄H₉ | do | |
| CH₃ | CH₃ | —CH₂— | 1 | —CH₂CH₂SC₂H₅ | do | III |
| CH₃ | CH₃ | —CH₂— | 2 | —(CH₂)₄— | 75° C | IV |
| CH₃ | CH₃ | —CH₂— | 2 | —CH₂—C(C₂H₅)₂—CH₂— | 80–82° C | |
| CH₃ | CH₃ | —CH₂— | 3 | —CH₂<br>—CH₂—C(C₂H₅)—<br>—CH₂ | Viscous resin | |
| CH₃ | CH₃ | —CH₂— | 4 | —CH₂—<br>—CH₂—C—CH₂—<br>—CH₂— | do | |

TABLE I—Continued

| $R_1$ | $R_2$ | X | n | $R_3$ | Melting point | Stabilizer No. |
|---|---|---|---|---|---|---|
| Isopropyl | Isopropyl | —CH$_2$— | 1 | —C$_{18}$H$_{37}$ | 45–47° C | V |
| CH$_3$ | Tert. butyl | —CH$_2$— | 1 | —C$_{18}$H$_{37}$ | 44–46° C | |
| Tert. butyl | do | —CH$_2$— | 1 | —CH$_3$ | 57–59° C | |
| Do | do | —CH$_2$— | 1 | —⟨C$_6$H$_5$⟩ | Liquid | |
| Do | do | —CH$_2$— | 1 | —CH—⟨C$_6$H$_5$⟩ | 50–51° C | |
| Do | do | —CH$_2$CH$_2$— | 1 | —C$_{18}$H$_{37}$ | 38–41° C | |
| Do | do | —CH(CH$_3$)— | 1 | —C$_{18}$H$_{37}$ | Liquid | |

TABLE II

| $R_1$ | $R_2$ | X | n | $R_3$ | Melting point (° C) | Stabilizer No. |
|---|---|---|---|---|---|---|
| CH$_3$ | CH$_3$ | —CH$_2$— | 1 | —C$_{18}$H$_{37}$ | 66–68 | |
| CH$_3$ | Tert. butyl | —CH$_2$— | 1 | —C$_{18}$H$_{37}$ | 68–69 | VI |
| Tert. butyl | do | —CH$_2$— | 1 | —C$_{18}$H$_{37}$ | 56–58 | |
| Do | do | —CH$_2$— | 1 | —CH$_3$ | 55 | |

Our novel stabilizers have an improved stabilizing effect when compared with known purely organic stabilizers such as the mixtures of alkylated phenols (German DAS 1,035,137) thiobisphenols, and ω-(hydroxy-alkyl-phenyl)-alkane carboxylic acid esters (German DAS 1,201,349); they are also more effective than the thiobis phenols which have been considered to belong to the best stabilizers of the type here involved.

The following examples illustrating the stabilizing effect of the new stabilizers are merely illustrative and are not intended to limit the invention to the specific materials and details disclosed.

EXAMPLE 1

Stabilization of Polypropylene

To 100 parts each of unstabilized polypropylene powder, the stabilizers listed in Table II were added. All mixtures were treated for 10 minutes at 180° C. on a laboratory roll mill, and the obtained films were pressed at 200 atm. and at a temperature of 210° C. From the obtained 1 mm. thick sheets, 5 strips were cut out and subjected by storage in a drying cabinet at 150° C. to an accelerated ageing; the time was determined after which an oxidative decomposition could be observed by the brittleness test.

TABLE III

| Stabilizer (Parts by weight) | Oxidative degradation after days (Brittleness test) |
|---|---|
| 0.5 L | 45 |
| 0.2 L+0.3 DLTDP | 72 |
| 0.5 M | 65 |
| 0.5 Stabilizer I | 100 |
| 0.5 Stabilizer V | 110 |

Stabilizer L=4,4'-thiobis- (6-tert.butyl-m-cresol).
Stabilizer M=β-(3,5-di-tert.butyl-4-hydroxy - phenyl)-propionic acid stearate.
DLTDP=dilaurylthiodipropionate.
Stabilizer I and V see Table I. In the films stabilized with said stabilizers, the oxidative degradation started later than in the films stabilized with the known stabilizers.

EXAMPLE 2

Stabilization of an ABS resin

Three mixtures (Table IV) were prepared, each from 100 parts by weight of ABS with 2 parts of 1,2-bis-stearoylaminoethane as lubricant and 0.5 parts of stabilizer. The mixtures were rolled on a laboratory roller mill for 10 minutes at 160° C., and the obtained films were pressed at a pressure of 200 atm. at a temperature of 180° C. to sheets of 1 mm. thickness. Test specimens cut from said sheets were stored in a drying cabinet at 110° C. to produce accelerating ageing, and the effect of the stabilizers was determined by the discoloration and brittleness of the specimens.

TABLE IV

| Stabilizer (parts by weight) | Color after 30 days | Brittleness starting after days |
|---|---|---|
| 0.25 2,6-di-tert.butyl-p-cresol<br>0.25 2,6-dimethylphenol | } Brown | 47 |
| 0.5 stabilizer L | do | 49 |
| 0.5 stabilizer I | Light brown | 55 |

The stabilizer of the invention shows distinctly a better effect.

EXAMPLE 3

Stabilization of polyamide (condensation products of dicarboxylic acids and diamines)

The four mixtures listed in Table V were prepared each from 100 parts of polyamide and 1 part of stabilizer and extruded at 250° C. to sheets from which samples were cut and subjected to accelerated ageing in a drying cabinet at 140° C.

The stabilizing effect was determined by the brittleness test and the color of the samples.

TABLE V

| Stabilizer (parts by weight) | Color at begin of ageing | Brittleness starting after days |
|---|---|---|
| 1 stabilizer L | Brown | 34 |
| 0.5 2,6-di-tert.butyl-p-cresol<br>0.5 2,6-dimethylphenol | } do | 10 |
| 1 stabilizer M | do | 27 |
| 1 stabilizer I | Yellow | 39 |
| 0.5 stabilizer II<br>0.5 tris-nonylphenyl phosphite | } Pale yellow | 42 |
| 1 stabilizer IV | Brown | 45 |

Particularly in combination with aryl phosphites, the stabilizers of the invention show a superior stabilizing effect.

EXAMPLE 4

Stabilization of mineral oil (Gardner color number 3–4, viscosity 144 Cps. at 20° C.)

100 g. each of a mineral oil were mixed with the stabilizers listed in Table VI, and 5 liters of oxygen were passed through the oil for 90 minutes at 190° C. The oxidative degradation of the oil was determined by the viscosity increase.

TABLE VI

| Stabilizer: | Viscosity Cps. at 20° C. |
|---|---|
| 0.05 g. 2,4,6-tri-tert. butyl phenol<br>0.05 g. 2,4-dimethylphenol | } 188 |
| 0.1 g. Stabilizer M | 192 |
| 0.1 g. Stabilizer VI | 165 |
| 0.05 g. Stabilizer III<br>0.05 g. Tris-nonylphenylphosphite | } 160 |

The stabilizers of the invention (III and VI) retard best the oxidative degradation of the oil. As shown by the Table, their addition resulted in the smallest viscosity increase.

EXAMPLE 5

Stabilization of vegetable oils and plasticizers

The same stabilizers as employed in Table V were used in a similar manner for a vegetable oil (olive oil) and a plasticizer (dioctylphthalate). The results were similar to those obtained with the mineral oil.

What is claimed is:

1. A composition comprising an organic material selected from the group consisting of polymeric resins, vegetable oils and fats, animal oils and fats, mineral oils, and plasticizers and 0.001 to 10 weight percent of a compound corresponding to a formula selected from the group consisting of

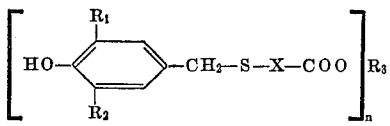

and

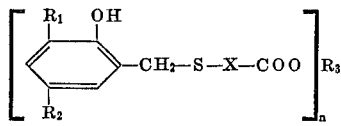

wherein $n$ is an integer from 1 to 4, $R_1$ and $R_2$ are alkyl having 1 to 6 carbons, $R_3$, for $n=1$, is selected from the group consisting of alkthioalkyl, alkoxyalkyl, and alkyl having up to 20 carbon atoms, and phenyl, benzyl and phenyl substituted with alkyl having 1 to 9 carbons, for $n=2$, $R_3$ is a member selected from the group consisting of a thiodialkylene, a dithiotrialkylene, an oxydialkylene, a dioxytrialkylene and an alkylene group, wherein the alkylene portion has from 1 to 20 carbon atoms, for $n=3$, $R_3$ is alktriyl having up to 20 carbons and for $n=4$, $R_3$ is alktetrayl having up to 20 carbons and X is lower is alktetrayl having up to 20 carbons and X is lower alkylene.

2. The composition of claim 1 wherein the stabilizer is

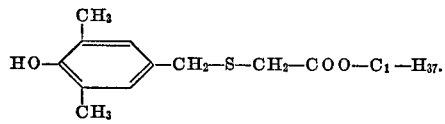

3. The composition of claim 1 wherein the stabilizer is

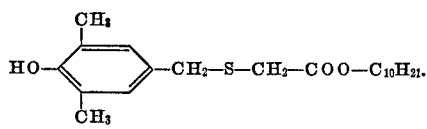

4. The composition of claim 1 wherein the stabilizer is

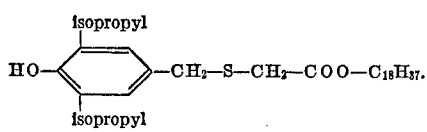

5. The composition of claim 1 wherein the stabilizer is

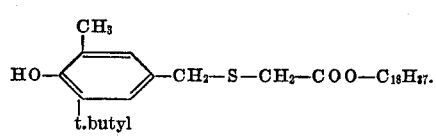

6. The composition according to claim 1 wherein the formula is

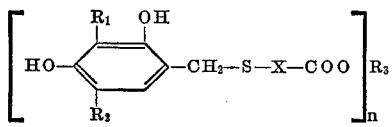

$n$ is 1, $R_1$ and $R_2$ are selected from the group consisting of methyl, isopropyl and t. butyl, X is selected from the group consisting of methylene, methyl methylene and ethylene and $R_3$ is selected from the group consisting of methyl, 2-ethylhexyl, cyclohexyl, decyl, stearyl, eicosyl, phenyl, benzyl, phenyl containing one or two alkyl substituents having 1 to 9 carbons, butoxyethyl and eththioethyl.

7. The composition of claim 1 wherein the formula is

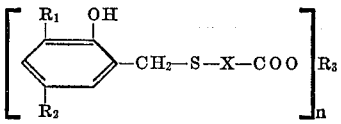

$n$ is 1, $R_1$ and $R_2$ are selected from the group consisting of methyl and t. butyl, X is methylene and R is selected from the group consisting of methyl and stearyl.

8. The composition of claim 1 wherein the formula is

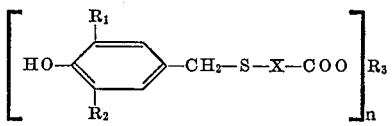

$n$ is 2 or 4, $R_1$ and $R_2$ are methyl, X is methylene, $R_3$ is 2,2-diethyl propylene, when $n$ is 2 and 2,2-dimethylene propylene when $n$ is 4.

9. The composition of claim 1 wherein the formula is

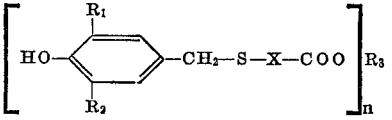

$n$ is 3, $R_1$ and $R_2$ are methyl, X is methylene and $R_3$ is

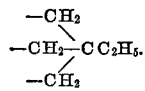

10. The composition of claim 1 wherein the formula is

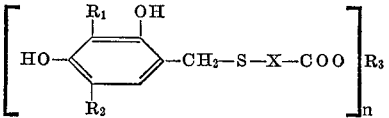

$R_1$ and $R_2$ are independently selected from the group consisting of methyl, isopropyl and t. butyl, X is selected from the group consisting of methylene, ethylene, tetramethylene, pentamethylene and methyl methylene, for $n=1$, $R_3$ is selected from the group consisting of —$CH_3$, —$C_2H_5$, —$\langle C_6H_{11} \rangle$, —$C_8H_{17}$, —$CH_2CH(CH_2)_3CH_3$,

—$C_{10}H_{21}$, —$C_{12}H_{25}$,

—$CH_2CH(CH_2)_3CHCH_3$ (with $CH_3$ groups),

—$C_6H_5$, —$CH_2C_6H_5$, —$C_6H_4CH_3$,
—$C_6H_4CH(CH_3)_2$, —$C_6H_4C(CH_3)_3$,
—$C_6H_4C_8H_{17}$, —$C_6H_3(CH_3)_2$,
—$C_6H_3[CH(CH_3)_2]_2$, —$C_6H_3(C_8H_{17})_2$,
—$C_6H_3(C_9H_{19})_2$, —$CH_2CH_2SCH_2CH_2$,
—$CH_2CH_2SC_4H_9$, —$C_3H_6SC_3H_7$,
—$C_4H_8SC_4H_9$, —$C_2H_4SC_2H_4SC_2H_5$,
—$C_2H_4OC_2H_5$, —$C_2H_5OC_4H_9$, —$C_3H_6OC_3H_7$,
—$C_4H_8OC_4H_9$ and —$C_2H_4OC_2H_4OC_2H_5$;

for $n=2$, $R_3$ is selected from the group consisting of $-CH_2-$, $-(CH_2)_4-$, $-(CH_2)_5-$, $-(CH_2)_{10}-$, $-(CH_2)_{15}-$,

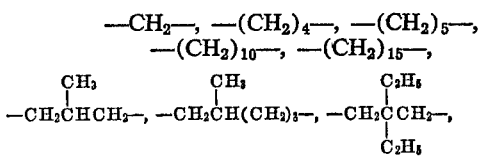

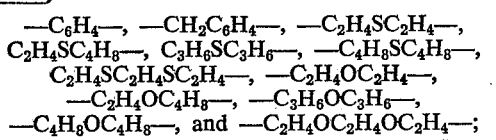

$-C_6H_4-$, $-CH_2C_6H_4-$, $-C_2H_4SC_2H_4-$, $C_2H_4SC_4H_8-$, $C_3H_6SC_3H_6-$, $-C_4H_8SC_4H_8-$, $C_2H_4SC_2H_4SC_2H_4-$, $-C_2H_4OC_2H_4-$, $-C_2H_4OC_4H_8-$, $-C_3H_6OC_3H_6-$, $-C_4H_8OC_4H_8-$, and $-C_2H_4OC_2H_4OC_2H_4-$;

for $n=3$, $R_3$ is selected from the group consisting of

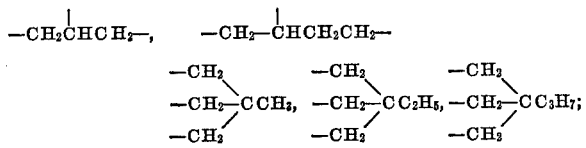

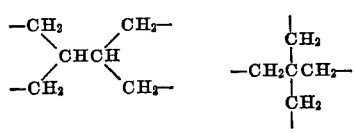

and for $n=4$, $R_3$ is selected from the group consisting of

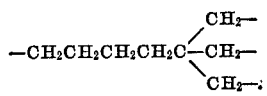

and $-CH_2CH_2CH_2CH_2C\overset{CH_2-}{\underset{CH_2-}{-CH_2-}}$;

11. Composition as claimed in claim 1 wherein said polymeric resins are selected from the class consisting of polyolefins, polyamids, polyacetals, polystyrene, butadiene-styrene polymers, copolymers of acrylonitrile, butadiene and styrene, vinyl polymers.

12. A composition comprising an organic material selected from the group consisting of polyolefins, polyamids, polystyrene containing butadiene-styrene polymers and copolymers of acrylonitrile, butadiene and styrene and 0.001 to 10 weight percent of a compound corresponding to the formula

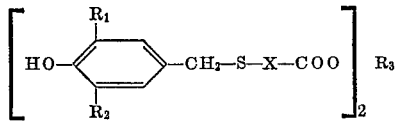

wherein X is lower alkylene, $R_1$ and $R_2$ are alkyl having 1 to 6 carbon atoms and $R_3$ is an alkylene group having 1 to 20 carbon atoms.

13. A composition comprising an organic material selected from the group consisting of polymeric resins, vegetable and animal oils and fats, mineral oils and plasticizers and 0.001 to 10 weight percent of a compound corresponding to the formula

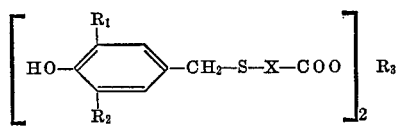

wherein X is lower alkylene, $R_1$ and $R_2$ are alkyl having 1 to 6 carbon atoms and $R_3$ is an alkylene group having 1 to 20 carbon atoms.

References Cited
UNITED STATES PATENTS 3,504,012  3/1970  Braus et al. _____ 260—45.85

V. P. HOKE, Primary Examiner

U.S. Cl. X.R.

99—163; 252—48.6, 57; 260—398.5, 963, 989